(12) United States Patent
Recio, III et al.

(10) Patent No.: US 9,644,130 B2
(45) Date of Patent: May 9, 2017

(54) REACTION PRODUCTS OF ACRYLAMIDE POLYMERS AND METHODS FOR USE THEREOF AS RELATIVE PERMEABILITY MODIFIERS

(71) Applicant: Halliburton Energy Services, Inc., Houston, TX (US)

(72) Inventors: Antonio Recio, III, Humble, TX (US); Larry Steven Eoff, Houston, TX (US); B. Raghava Reddy, The Woodlands, TX (US); Christopher Austin Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 103 days.

(21) Appl. No.: 14/438,514

(22) PCT Filed: Jun. 27, 2014

(86) PCT No.: PCT/US2014/044612
§ 371 (c)(1),
(2) Date: Apr. 24, 2015

(87) PCT Pub. No.: WO2015/199725
PCT Pub. Date: Dec. 30, 2015

(65) Prior Publication Data
US 2016/0289525 A1    Oct. 6, 2016

(51) Int. Cl.
*C09K 8/035* (2006.01)
*E21B 43/16* (2006.01)
(Continued)

(52) U.S. Cl.
CPC .............. *C09K 8/035* (2013.01); *C08F 20/56* (2013.01); *C09K 8/42* (2013.01); *C09K 8/50* (2013.01);
(Continued)

(58) Field of Classification Search
None
See application file for complete search history.

(56) References Cited

U.S. PATENT DOCUMENTS

| 5,208,216 A | 5/1993 | Williamson et al. |
| 6,228,812 B1 | 5/2001 | Dawson et al. |

(Continued)

FOREIGN PATENT DOCUMENTS

| WO | 2013/091023 | 6/2013 |
| WO | 2015199725 A1 | 12/2015 |

OTHER PUBLICATIONS

Ladut'ko et al., Field Application Results of Water Permeability Modifier in Fracture Stimulation Treatments in Western Siberia, SPE 158389, 2012.

(Continued)

*Primary Examiner* — John J Figueroa
(74) *Attorney, Agent, or Firm* — McDermott Will & Emery LLP (57) ABSTRACT

Suppressing passage of an aqueous fluid in a subterranean formation in preference to passage of an oleaginous fluid can often be desirable. Methods for suppressing the passage of an aqueous fluid in a subterranean formation, particularly a carbonate formation, can comprise: providing a treatment fluid comprising a carrier fluid and a relative permeability modifier comprising a reaction product of 1) an acrylamide polymer, any copolymer thereof, any derivative thereof, any salt thereof, or any combination thereof, and 2) a plurality of amine-containing compounds or any salt thereof, each amine-containing compound containing a primary amine, a secondary amine, or any combination thereof, and the amine-containing compounds being randomly reacted with (Continued)

at least a portion of the amide groups of the acrylamide polymer; and introducing the treatment fluid into a subterranean formation.

13 Claims, 3 Drawing Sheets

(51) Int. Cl.
 *C09K 8/502* (2006.01)
 *C09K 8/508* (2006.01)
 *C08F 20/56* (2006.01)
 *C09K 8/42* (2006.01)
 *C09K 8/50* (2006.01)
 *C09K 8/62* (2006.01)

(52) U.S. Cl.
 CPC ............ *C09K 8/502* (2013.01); *C09K 8/5083* (2013.01); *C09K 8/62* (2013.01); *E21B 43/16* (2013.01)

(56) References Cited

U.S. PATENT DOCUMENTS

| | | | |
|---|---|---|---|
| 6,364,016 B1 | 4/2002 | Dalrymple et al. | |
| 7,117,942 B2* | 10/2006 | Dalrymple | C09K 8/5083 166/278 |
| 8,413,719 B2 | 4/2013 | Milne et al. | |
| 8,420,576 B2* | 4/2013 | Eoff | C09K 8/508 166/270 |
| 8,623,793 B2* | 1/2014 | Eoff | C09K 8/508 166/270 |
| 2005/0155796 A1* | 7/2005 | Eoff | C09K 8/035 175/72 |
| 2005/0164894 A1* | 7/2005 | Eoff | C09K 8/5083 507/200 |
| 2005/0230114 A1* | 10/2005 | Eoff | C09K 8/5083 166/295 |
| 2005/0284632 A1* | 12/2005 | Dalrymple | C09K 8/5083 166/278 |
| 2007/0039732 A1 | 2/2007 | Dawson et al. | |
| 2008/0070805 A1* | 3/2008 | Munoz | C09K 8/5086 507/110 |
| 2008/0196897 A1* | 8/2008 | Nguyen | C09K 8/508 166/295 |
| 2010/0216672 A1 | 8/2010 | Todd | |
| 2011/0034351 A1* | 2/2011 | Eoff | C09K 8/508 507/212 |
| 2012/0018160 A1* | 1/2012 | Al-Yousef | E21B 43/20 166/305.1 |
| 2013/0264060 A1* | 10/2013 | De Wolf | C09K 8/528 166/305.1 |

OTHER PUBLICATIONS

International Search Report and Written Opinion for PCT/US2014/044612 dated Feb. 27, 2015.

Taylor et al., Water-Soluble Hydrophobically Associating Polymers for Improved Oil Recovery: A Literature Review, Journal of Petroleum Science and Engineering, 1998, vol. 19, No. 3, pp. 265-280.

* cited by examiner

REACTION PRODUCTS OF ACRYLAMIDE POLYMERS AND METHODS FOR USE THEREOF AS RELATIVE PERMEABILITY MODIFIERS

BACKGROUND

The present disclosure generally relates to methods and compositions for decreasing water permeability within a subterranean formation, and, more specifically, to relative permeability modifiers formed from acrylamide polymers and use thereof in a subterranean formation, particularly a carbonate formation.

Treatment fluids can be used in a variety of subterranean operations. Such subterranean operations can include, without limitation, drilling operations, stimulation operations, production operations, remediation operations, sand control treatments and the like. As used herein, the terms "treat," "treatment" and "treating" refer to any subterranean operation that uses a fluid in conjunction with achieving a desired function and/or for a desired purpose. Use of these terms does not imply any particular action by the treatment fluid or any component thereof, unless otherwise specified herein. Illustrative treatment operations can include, for example, fracturing operations, gravel packing operations, acidizing operations, scale dissolution and removal operations, consolidation operations, and the like.

When performing these or other subterranean treatment operations, it can sometimes be desirable to suppress the flow of a fluid in a subterranean formation. It can be particularly desirable to suppress the flow of an aqueous fluid in the subterranean formation, especially during production of a hydrocarbon resource from the subterranean formation. When a subterranean formation contains water in significant quantities, water's high mobility often allows it to flow to a wellbore by way of natural and manmade fractures and high permeability subterranean zones. The unwanted production of water from a hydrocarbon-producing well can constitute a considerable technical problem and expense during oilfield operations. If the ratio of produced water to a produced hydrocarbon resource becomes sufficiently large, the cost of separating the water from the hydrocarbon resource and disposing of the water can become a barrier to continued production. Excessive water production can even lead to abandonment of a wellbore penetrating a subterranean formation, even when significant amounts of hydrocarbons remain therein.

In some instances, various polymer systems can be introduced to a subterranean formation in order to form a temporary or permanent fluid seal therein. Through judicious placement of the fluid seal, a decrease in water production can sometimes be realized while not overly impacting the production of a hydrocarbon resource. Selective placement of the polymers under the formation conditions can sometimes be problematic, and improper placement of a fluid seal can sometimes detrimentally impact hydrocarbon production. In such situations, an agent that is not dependent upon judicious placement methods and does not cause detrimental results when improperly placed in a subterranean formation can be particularly desirable.

In regard to the foregoing, a technique that has been used to decrease the production of water, primarily from siliceous formations, is to introduce a relative permeability modifier to the formation. As used herein, the term "relative permeability modifier (RPM)" refers to a substance that decreases the flow of water in a subterranean formation while having a minimal effect on the flow of hydrocarbons. Since they minimally impact the flow of hydrocarbons, relative permeability modifiers can often be introduced to a subterranean formation without employing zonal isolation techniques that can be commonly employed with other agents (a strategy known as "bull heading" of the treatment fluid). Illustrative relative permeability modifiers can include both hydrophobically modified hydrophilic polymers and hydrophilically modified hydrophilic polymers, such as those described in commonly owned U.S. Pat. Nos. 6,476,169 and 7,114,568. An illustrative commercial relative permeability modifier product is HPT-1, which is a cationic hydrophobically modified hydrophilic polymer available from Halliburton Energy Services in its WATERWEB treatment service.

Permeability modification of aqueous fluid flow in subterranean formations can sometimes beneficially suppress treatment fluid loss to high permeability subterranean zones. Such fluid loss may occur in various subterranean operations including, for example, flooding operations in enhanced oil recovery, establishing fluid recirculation in drilling, cementing, fracturing and gravel packing operations, and diverting operations, such as those employed in acid stimulations.

When hydrophobically modified hydrophilic polymers are used in treating a siliceous formation, such as a silicate, aluminosilicate or like siliceous formation, prolonged reduction of the water permeability within the formation can often be realized. In contrast, when employed under similar conditions in a carbonate formation, the water permeability reduction effect is frequently much less sustained over an extended period of time. Although a cationic RPM can be reapplied to a carbonate formation once the initial water permeability reduction has waned, such retreatment can be undesirable from a time and materials standpoint, both of which increase production costs. While sustained water permeability reduction is not always necessary, such as during short-term diversion or fluid loss control operations, it can be desirable in many cases, particularly during ongoing production operations in producing wells.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

The present disclosure generally relates to methods and compositions for decreasing water permeability within a subterranean formation, and, more specifically, to relative permeability modifiers formed from acrylamide polymers and use thereof in a subterranean formation, particularly a carbonate formation.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

The present inventors surprisingly discovered a new class of anionic polymers that are completely different from relative permeability modifiers currently known in the art. Specifically, the present inventors discovered that anionically modified acrylamide polymers and various derivatives thereof may be effectively used for suppressing the passage of water through a subterranean formation in preference to the passage of oleaginous fluids. More particularly, in some embodiments, the relative permeability modifiers described herein may include a hydrophobic modification and one or more anionic modifications appended thereto. One or more of the anionic modifications may comprise a chelating functionality according to some embodiments described herein. As used herein, a "chelating functionality" will refer to one or more structural components of a single molecule that are collectively capable of forming multiple metal-ligand bonds to a single metal ion. Without being bound by theory or mechanism, it is believed that the permeability modification effects are due to the presence of multiple anionic groups tethered 2 to about 30 carbon atoms away from the polymer backbone.

Moreover, the polymers described herein may offer more prolonged water permeability reduction effects in carbonate formations than do conventional relative permeability modifiers, particularly non-ionic or cationic relative permeability modifiers. For example, the water permeability reduction effects provided by the polymers described herein may be prolonged over a week or more, or a month or more, or even up to a year or more. Remaining unbound by any theory or mechanism, it is believed that the anionic groups of the polymers described herein are more suitable to interact with a carbonate surface than are cationic groups. In addition, the chelating functionality that may be present in the polymers described herein can also interact with a carbonate surface through metal ion complexation, thereby further anchoring the polymer to the carbonate surface.

As a further advantage, the polymers described herein may be manufactured in various fluid phases at high polymer concentrations without excessive viscosification occurring, thereby allowing high concentration treatment fluids to be readily transported to a well site, which may then be diluted to a desired polymer concentration for introduction to a subterranean formation. HPT-1 and similar hydrophobically modified hydrophilic polymers, in contrast, are generally produced in fairly low concentrations (e.g., under 5% by weight) due to their limited solubility values. In addition, HPT-1 and similar polymers can present precipitation issues under certain pH conditions. Therefore, use of the polymers described herein can desirably avoid the viscosity and solubility issues associated with other commonly used relative permeability modifiers.

In addition, the polymers described herein can also be desirable due to their relatively inexpensive synthesis via ready modification of acrylamide polymers and copolymers, with minimal reaction and workup steps being required. For example, in some embodiments, the polymers described herein may be readily synthesized by reacting the amide groups of an acrylamide polymer (e.g., by a transamidation reaction) with one or more amine-containing compounds having an anionic group. Alternative synthetic routes to obtain similar polymers are also possible and may also be readily conducted. For example, anionically substituted acrylamide monomers may be copolymerized by radical polymerization to produce similar polymers, or polyacrylic acid polymers or copolymers may be amidated with one or more amine-containing compounds having an anionic group or an anionic group precursor. Accordingly, use of the polymers described herein in various treatment operations is expected to be cost effective relative to existing technologies.

In various embodiments, compositions described herein can comprise a reaction product of 1) an acrylamide polymer, any copolymer thereof, any derivative thereof, any salt thereof, or any combination thereof, and 2) a plurality of amine-containing compounds or any salt thereof, each amine-containing compound containing a primary amine, a secondary amine, or any combination thereof, and the amine-containing compounds being randomly reacted with at least a portion of the amide groups of the acrylamide polymer. As used herein, the term "acrylamide polymer" will refer to any polymer containing acrylamide monomer units or any derivative thereof. As used herein, the term "copolymer" will refer to any polymer having two or more different monomer units therein, including terpolymers and higher polymers. In various embodiments, the reaction product may be a relative permeability modifier.

In more particular embodiments, the amine-containing compounds may comprise one or more of the following compounds or any salt thereof: a primary alkyl or aryl amine having about 2 to about 30 carbon atoms, a phosphonic acid-terminated primary alkyl amine, a sulfonic acid-terminated primary alkyl amine, and an iminodicarboxylic acid-terminated primary alkyl amine. Further description of each of these amine-containing compounds follows below.

Scheme 1 shows a reaction schematic illustrating how reaction products of the present disclosure may be synthesized by randomly transamidating a polyacrylamide polymer. It is to be recognized that the random amide group functionalization pattern shown in the reaction product of Scheme 1 is illustrative in nature only and has been shown merely to exemplify the disclosure herein. It is to be further recognized that any amide groups not functionalized with an amine-containing compound may remain as primary amide groups appended to the polymer backbone, or at least some of them may be hydrolyzed to carboxylic acids. Similarly, carboxylic acids may be functionalized with alkyl or aryl esters, if desired, in a subsequent reaction step. Such carboxylic acids may be initially present when a partially hydrolyzed polyacrylamide is functionalized according to the disclosure herein, or the carboxylic acid groups may arise through hydrolysis in the course of forming the reaction product. In the interest of simplicity, backbone carboxylic acid and ester groups have not been depicted in the reaction product shown in Scheme 1, but it is to be recognized that any backbone primary amide group may instead be present as a carboxylic acid or an ester.

Scheme 1 x = integer ranging from 1 to 28
Ay = any one or more of the following:
$A_1$ = $CH_3$
$A_2$ = $PO_3H_2$
$A_3$ = $SO_3H$
$A_4$ = iminodicarboxylic acid In more specific embodiments, compositions described herein may comprise a relative permeability modifier comprising a reaction product of 1) an acrylamide polymer, any copolymer thereof, any derivative thereof, any salt thereof, or any combination thereof, and 2) a plurality of amine-containing compounds or any salt thereof, the amine-containing compounds being randomly reacted with at least a portion of the amide groups of the acrylamide polymer, and the amine-containing compounds comprising one or more of the following compounds or any salt thereof: a primary alkyl or aryl amine having about 2 to about 30 carbon atoms, a phosphonic acid-terminated primary alkyl amine, a sulfonic acid-terminated primary alkyl amine, and an iminodicarboxylic acid-terminated primary alkyl amine.

In various embodiments, the reaction product may be formed by reacting the acrylamide polymer with one or more of the amine-containing compounds (e.g., by a transamidation reaction). In some embodiments, the reaction product may be formed by reacting the acrylamide polymer with at least the primary alkyl or aryl amine having about 2 to about 30 carbon atoms. In some embodiments, the reaction product may be formed by reacting the acrylamide polymer with the primary alkyl or aryl amine having about 2 to about 30 carbon atoms and at least one other amine-containing compound. In some embodiments, the reaction product may be formed by reacting the acrylamide polymer with the primary alkyl or aryl amine having about 2 to about 30 carbon atoms and the phosphonic acid-terminated primary alkyl amine. In some embodiments, the reaction product may be formed by reacting the acrylamide polymer with the primary alkyl or aryl amine having about 2 to about 30 carbon atoms and the sulfonic acid-terminated primary alkyl amine. In some embodiments, the reaction product may be formed by reacting the acrylamide polymer with the primary alkyl or aryl amine having about 2 to about 30 carbon atoms and the iminodicarboxylic acid-terminated primary alkyl amine.

In some embodiments, the reaction product may be formed by reacting the acrylamide polymer with the primary alkyl or aryl amine having about 2 to about 30 carbon atoms and at least two other amine-containing compounds. In some embodiments, the reaction product may be formed by reacting the acrylamide polymer with the primary alkyl or aryl amine having about 2 to about 30 carbon atoms, the phosphonic acid-terminated primary alkyl amine, and the sulfonic acid-terminated primary alkyl amine. In some embodiments, the reaction product may be formed by reacting the acrylamide polymer with the primary alkyl or aryl amine having about 2 to about 30 carbon atoms, the phosphonic acid-terminated primary alkyl amine, and the iminodicarboxylic acid-terminated primary alkyl amine. In some embodiments, the reaction product may be formed by reacting the acrylamide polymer with the primary alkyl or aryl amine having about 2 to about 30 carbon atoms, the sulfonic acid-terminated primary alkyl amine, and the iminodicarboxylic acid-terminated primary alkyl amine.

In some embodiments, the reaction product may be formed by reacting the acrylamide polymer with the primary alkyl or aryl amine having about 2 to about 30 carbon atoms and at least three other amine-containing compounds. That is, in some embodiments, the reaction product may be formed from at least some of each type of amine-containing compound. Specifically, in some embodiments, the reaction product may be formed by reacting the acrylamide polymer with the primary alkyl or aryl amine having about 2 to about 30 carbon atoms, the phosphonic acid-terminated primary alkyl amine, the sulfonic acid-terminated primary alkyl amine, and the iminodicarboxylic acid-terminated primary alkyl amine.

In some embodiments, the reaction product may be formed by reacting the acrylamide polymer with at least two of the amine-containing compounds. In other various embodiments, the reaction product may be formed by reacting the acrylamide polymer with at least three of the amine-containing compounds. In still other various embodiments, the reaction product may be formed by reacting the acrylamide polymer with at least some of each of the amine-containing compounds. When the reaction product contains less than all of each type of amine-containing compound, any combination of the amine-containing compounds may be present.

In various embodiments, one or more members of each type of amine-containing compound may be present when forming the reaction products described herein. In some embodiments, one member of each type of amine-containing compound may be present when forming the reaction product, each amine-containing compound becoming incorporated into the reaction product. In some or other embodiments, two or more members of at least some of the amine-containing compounds may be present when forming the reaction product, or three or more members of at least some of the amine-containing compounds may be present when forming the reaction product. In some embodiments, equal numbers of each type of amine-containing compound may be present when forming the reaction product, and in other embodiments, at least one of the types of the amine-containing compounds may have a differing number of members than do the other types of the amine-containing compounds.

Suitable primary alkyl or aryl amines having about 2 to about 30 carbon atoms are not believed to be particularly limited in structure. In various embodiments, primary alkyl amines may be straight chained or branched at any location, and cyclic groups may also be present in some embodiments. Particularly suitable primary alkyl amines may include, for example, octylamine, decylamine, dodecylamine, hexadecylamine, octadecylamine, and the like. Suitable primary aryl amines may include aniline and aniline derivatives, such as ring-alkylated anilines, for example. Benzylic amines or other primary alkyl amines containing an aryl group may similarly be used in forming the reaction product in some embodiments.

Suitable phosphonic acid-terminated primary alkyl amines may have a general structure of $H_2N—Z—PO_3H_2$, where Z represents a carbon-containing spacer group. In more particular embodiments, carbon-containing spacer group Z may comprise a methylene chain $(CH_2)_n$, wherein n is an integer ranging from 2 to about 28 in some embodiments, from 2 to about 10 in other embodiments, and from 2 to about 6 in still other embodiments. In some embodiments, a suitable phosphonic acid-terminated primary alkyl amine may comprise aminoethylphosphonic acid.

Suitable sulfonic acid-terminated primary alkyl amines may have a general structure of $H_2N—Z—SO_3H$, where Z represents a carbon-containing spacer group. In more particular embodiments, carbon-containing spacer group Z may comprise a methylene chain $(CH_2)_n$, wherein n is an integer ranging from 2 to about 28 in some embodiments, from 2 to about 10 in other embodiments, and from 2 to about 6 in still other embodiments. In some embodiments, a suitable sulfonic acid-terminated primary alkyl amine may comprise aminoethylsulfonic acid (also known as taurine).

Suitable iminodicarboxylic acid-terminated primary alkyl amines may have a general structure represented by Formula 1 below Formula 1 where Z represents a carbon-containing spacer group and $R_1$ and $R_2$ are independently H, alkyl or $(CH_2)_mCO_2H$, where m is an integer ranging between 1 and about 5. In more particular embodiments, Z may comprise a methylene chain $(CH_2)_n$, wherein n is an integer ranging from 2 to about 28 in some embodiments, from 2 to about 10 in other embodiments, and from 2 to about 6 in still other embodiments. In some embodiments, both $R_1$ and $R_2$ may be H and n may be 2-4 or 3-5. In other embodiments, both $R_1$ and $R_2$ may be alkyl and n may be 2-4 or 3-5. In still other embodiments, both $R_1$ and $R_2$ may be $CH_2CO_2H$ and n may be 2-4 or 3-5. Other aminopolycarboxylic acid chelating agents may also be suitable for practicing the various embodiments described herein.

In some embodiments, substantially equal quantities of the amine-containing compounds may be present when forming the reaction product. In other embodiments, the quantity of at least one of the amine-containing compounds may differ from that of the other amine-containing compounds. In various embodiments, the combined molar amounts of the amine-containing compounds may range between about 5 mol. % to about 35 mol. % of the monomers present in the acrylamide polymer. In some embodiments, the mol % of the primary alkyl or aryl amine having about 2 to 30 carbon atoms may range from 0 to about 15 mol. % of the monomers present in the acrylamide polymer. In some embodiments, the mol % of the phosphonic acid-terminated primary alkyl amine may range from 0 to about 15 mol. % of the monomers present in the acrylamide polymer. In some embodiments, the mol % of the sulfonic acid-terminated primary amine may range from 0 to about 20 mol. % of the monomers present in the acrylamide polymer. In some embodiments, the mol % of the iminodicarboxylic acid-terminated primary alkyl amine may range from 0 to about 25 mol. % of the monomers present in the acrylamide polymer.

Suitable acrylamide polymers and copolymers are not believed to be particularly limited in practicing the various embodiments described herein. In some embodiments, the acrylamide polymer or copolymer may contain at least 20 mol. % acrylamide monomers or any derivative thereof. In some embodiments, the acrylamide polymer may comprise polyacrylamide, an acrylamide copolymer (including acrylamide terpolymers), a partially hydrolyzed polyacrylamide, a hydrophobically modified polyacrylamide, any derivative thereof, any salt thereof, or any combination thereof. As used herein, the term "acrylamide copolymer" will refer to a polymer containing acrylamide monomer units and at least one other type of comonomer unit, including acrylamide terpolymers. Such acrylamide copolymers may be of any type, such as random, alternating, block, graft and the like. Examples of suitable comonomers that may be present in acrylamide copolymers include, for instance, 2-acrylamido-2-methylpropane sulfonic acid, acrylic acid, alkylacrylic acids, vinyl sulfonic acid, vinyl phosphonic acid, vinylpyrrolidone, alkyl acrylates and alkyl acrylamides. In each case, the alkyl groups may contain between 1 and about 30 carbon atoms and be straight chained or branched. As used herein, the term "partially hydrolyzed polyacrylamide" will refer to an acrylamide polymer or copolymer in which a portion of the amide groups of the acrylamide monomer units have been hydrolyzed to acrylic acid monomer units. As used herein, the term "hydrophobically modified polyacrylamide" will refer to an acrylamide polymer or copolymer having acrylamide monomer units or other comonomer units bearing an alkyl chain functionality having about 6 carbon atoms or more, which may be straight chained or branched. In various embodiments, the hydrophobically modified polyacrylamide may have about 25% or fewer hydrophobically modified monomer units, or about 10% or fewer hydrophobically modified monomer units, or about 5% or fewer hydrophobically modified monomer units.

In more specific embodiments, the acrylamide polymer may comprise polyacrylamide, a copolymer of acrylamide and t-butyl acrylate, a partially hydrolyzed variant thereof, a hydrophobically modified variant thereof, any derivative thereof, any salt thereof, or any combination thereof. Suitable examples of partially hydrolyzed polyacrylamides may include, for example, HZ-30, which has a molecular weight of about 500,000, and FR-66, which has a molecular weight of at least about 10,000,000, each of which is available from Halliburton Energy Services. In various embodiments, about 0.1% to about 30% of the amide groups in partially hydrolyzed polyacrylamides can be hydrolyzed to carboxylic acids. A suitable example of an acrylamide copolymer can include, for example, HZ-10, a copolymer of acrylamide and t-butyl acrylate, which is available from Halliburton Energy Services.

In some embodiments, the compositions described herein can further comprise a carrier fluid in which the relative permeability modifier comprising the reaction product is disposed. Suitable carrier fluids may comprise an aqueous carrier fluid or an oil-based carrier fluid. Suitable aqueous carrier fluids may include, for example, fresh water, salt water, brine (saturated salt water), seawater, produced water (i.e., subterranean formation water brought to the surface), surface water (e.g., lake or river water), flow back water (i.e., water placed into a subterranean formation and then brought back to the surface), and the like. In various embodiments, an amount of the carrier fluid may be chosen based on factors such as, for example, the solubility of the reaction product in the carrier fluid, a pore volume of a subterranean formation being treated, and an operationally effective concentration of the reaction product in a particular subterranean formation. By maintaining the reaction product concentration as high as possible, the reaction product can be effectively conveyed within a subterranean formation without using an excessive volume of the carrier fluid.

In various embodiments, a concentration of the reaction product in the carrier fluid may range between about 0.1% to about 25% by weight. In more particular embodiments, a concentration of the reaction product in the carrier fluid may range between about 0.5% to about 10% by weight, or between about 1% to about 7% by weight, or between about 5% to about 20% by weight, or between about 1% to about 15% by weight, or between about 5% to about 15% by weight.

In still other various embodiments, the compositions described herein may further comprise a surfactant in addition to the carrier fluid and the reaction product. Suitable surfactants may include cationic surfactants, anionic surfactants, neutral surfactants, zwitterionic surfactants, or any combination thereof. When present, a concentration of the surfactant in the carrier fluid can range between about 0.1% to about 2.0% by weight, or between about 0.5% to about 1.5% by weight in various embodiments. Particularly suitable surfactants may include, but are not limited to trimethylbenzylammonium chloride and sodium lauryl sulfate.

In still other various embodiments, the compositions described herein may further include numerous other components, particularly components that are used for formulating treatment fluids for use in various subterranean operations. Depending on the intended function of a treatment fluid containing the compositions described herein, such additional components may include, for example, salts, pH control additives, foaming agents, antifoaming agents, breakers, biocides, crosslinkers, additional fluid loss control agents, stabilizers, chelating agents, scale inhibitors, gases, mutual solvents, particulates, corrosion inhibitors, oxidizing agents, reducing agents, antioxidants, relative permeability modifiers, viscosifying agents, proppant particulates, gravel particulates, scale inhibitors, emulsifying agents, de-emulsifying agents, iron control agents, clay control agents, flocculants, scavengers, lubricants, friction reducers, viscosifiers, weighting agents, hydrate inhibitors, consolidating agents, any combination thereof, and the like. A person having ordinary skill in the art and the benefit of this disclosure will recognize when such additional components should be included in a treatment fluid, as well as the appropriate amounts to include.

Methods for synthesizing the reaction products described herein are also contemplated in various embodiments.

In some embodiments, the methods may comprise: reacting at least a portion of the amide groups in an acrylamide polymer, any copolymer thereof, any derivative thereof, any salt thereof, or any combination thereof with one or more amine-containing compounds comprising one or more of the following compounds or any salt thereof: a primary alkyl or aryl amine having about 2 to about 30 carbon atoms, a phosphonic acid-terminated primary alkyl amine, a sulfonic acid-terminated primary alkyl amine, and an iminodicarboxylic acid-terminated primary alkyl amine. In some embodiments, reacting the amine-containing compounds with the acrylamide polymer may comprise heating the acrylamide polymer and the amine-containing compounds together. In some embodiments, the acrylamide polymer may be reacted with at least some of each of the amine-containing compounds. In other embodiments, less than all of the amine-containing compounds may be reacted with the acrylamide polymer to form the reaction product, as generally discussed above.

In some embodiments, reacting the acrylamide polymer with the amine-containing compounds may take place in substantially the same timeframe. For example, in such embodiments, the acrylamide polymer may be reacted with all of the amine-containing compounds together in one pot. In other embodiments, at least one of the amine-containing compounds may be reacted with the acrylamide polymer in a different timeframe than are the other amine-containing compounds. For example, in some embodiments, a portion of the amine-containing compounds may be reacted with the acrylamide polymer in a first reaction step to form an intermediate reaction product, and the remaining amine-containing compounds may be reacted with at least a portion of the residual amide groups in the intermediate reaction product in a second reaction step.

In more specific embodiments, the methods for preparing the reaction products described herein may comprise: reacting at least a portion of the amide groups in an acrylamide polymer, any copolymer thereof, any derivative thereof, any salt thereof, or any combination thereof with one or more amine-containing compounds comprising one or more of the following compounds or any salt thereof: a primary alkyl or aryl amine having about 2 to about 30 carbon atoms, a phosphonic acid-terminated primary alkyl amine, and a sulfonic acid-terminated primary alkyl amine, an intermediate reaction product being formed that has at least some residual amine groups present therein; and reacting at least a portion of the residual amide groups in the intermediate reaction product with an iminodicarboxylic acid-terminated primary alkyl amine or any salt thereof to form a randomly functionalized acrylamide polymer. That is, in such embodiments, at least the iminodicarboxylic acid-terminated primary alkyl amine may be present in the reaction product in combination with one or more of the primary alkyl or aryl amine having about 2 to about 30 carbon atoms, the phosphonic acid-terminated primary alkyl amine, or the sulfonic acid-terminated primary alkyl amine. In some embodiments, at least the primary alkyl or aryl amine having about 2 to about 30 carbon atoms may be reacted with the acrylamide polymer in combination with the iminodicarboxylic acid-terminated primary alkyl amine. In some embodiments, at least the phosphonic acid-terminated primary alkyl amine may be reacted with the acrylamide polymer in combination with the iminodicarboxylic acid-terminated primary alkyl amine. In some embodiments, at least the sulfonic acid-terminated primary alkyl amine may be reacted with the acrylamide polymer in combination with the iminodicarboxylic acid-terminated primary alkyl amine. In some or other embodiments, at least some of each of the amine-containing compounds may be reacted with the acrylamide polymer.

In some embodiments, reacting at least a portion of the residual amide groups in the intermediate reaction product may take place after reacting the acrylamide polymer with the other amine-containing functionalities. In other embodiments, the intermediate reaction product may still be in the process of being formed from polyacrylamide while its residual amide groups are being reacted with one or more of the amine-containing functionalities. In the latter embodiments, each of the amine-containing compounds may be present in a combined reaction mixture when forming the reaction product.

In some embodiments, the primary alkyl or aryl amine having about 2 to about 30 carbon atoms, the phosphonic acid-terminated primary alkyl amine, and/or the sulfonic acid-terminated primary alkyl amine may be reacted with the acrylamide polymer in a single mixture in forming the intermediate reaction product described above. Any one or more of the amine-containing compounds may be present in the single mixture. Thereafter, in further embodiments, the intermediate reaction product may be reacted with the iminodicarboxylic acid-terminated primary alkyl amine. In more specific embodiments, the acrylamide polymer may be reacted with a mixture comprising the primary alkyl or aryl amine having about 2 to about 30 carbon atoms, the phosphonic acid-terminated primary alkyl amine, and the sulfonic acid-terminated primary alkyl amine to form the intermediate reaction product, and the intermediate reaction product may thereafter be reacted with the iminodicarboxylic acid-terminated primary alkyl amine or any salt thereof to form the reaction product.

In some embodiments, the intermediate reaction product may optionally be isolated from the mixture in which it was formed before being reacted with the iminodicarboxylic acid-terminated primary alkyl amine. More desirably, however, the intermediate reaction product may be further reacted with the iminodicarboxylic acid-terminated primary alkyl amine without first isolating the intermediate reaction product from the mixture in which it was formed. Other intermediate reaction products may be similarly formed in a stepwise fashion in the course of forming a final reaction product. For example, in an exemplary non-limiting embodiment, the acrylamide polymer may be reacted with the primary alkyl or aryl amine having about 2 to about 30 carbon atoms to form an intermediate reaction product, and this intermediate reaction product may be then reacted, ideally without isolation, with one or more of the phosphonic acid-terminated primary alkyl amine, the sulfonic acid-terminated primary alkyl amine, or the iminodicarboxylic acid-terminated primary alkyl amine.

In more specific embodiments, the acrylamide polymer may be reacted with the primary alkyl or aryl amine having about 2 to about 30 carbon atoms and at least one other amine-containing compound. In some embodiments, the at least one other amine-containing compound may comprise at least the iminodicarboxylic acid-terminated primary alkyl amine. In other embodiments, the at least one other amine-containing compound may comprise at least the phosphonic acid-terminated primary alkyl amine. In still other embodiments, the at least one other amine-containing compound may comprise at least the sulfonic acid-terminated primary alkyl amine. In various embodiments, the primary alkyl or aryl amine having about 2 to about 30 carbon atoms and the at least one other amine-containing compound may be reacted with the acrylamide polymer in any order. In some embodiments, the primary alkyl or aryl amine having about 2 to about 30 carbon atoms may be reacted with the acrylamide polymer first, and in other embodiments, the at least one other amine-containing compound may be reacted with the acrylamide polymer first. In still other embodiments, the primary alkyl or aryl amine having about 2 to about 30 carbon atoms and the at least one other amine-containing compound may be reacted with the acrylamide polymer concurrently (i.e., in the same reaction mixture).

As described above, in some embodiments, at least some of the amine-containing compounds may be reacted with the acrylamide polymer in substantially the same timeframe by virtue of their being present in a mixture together with one another. In other embodiments, the amine-containing compounds may be reacted sequentially with the acrylamide polymer in the course of forming the reaction product. In some embodiments, a first amine-containing compound may be reacted with the acrylamide polymer to form a first intermediate product, which is then reacted with a second amine-containing compound to form a second intermediate product, and so on until the desired reaction product has been formed. In an illustrative embodiment, the primary alkyl or aryl amine having about 2 to about 30 carbon atoms may be reacted with the acrylamide polymer to form a first intermediate product, the first intermediate product may be reacted with the phosphonic acid-terminated primary alkyl amine to form a second intermediate product, the second intermediate product may be reacted with the sulfonic acid-terminated primary alkyl amine to form a third intermediate product, and the third intermediate product may be reacted with the iminodicarboxylic acid-terminated primary alkyl amine to form the final reaction product. It is to be recognized that the order of the sequential reaction operations may be altered, and one or more of the sequential reaction operations may be omitted in some embodiments, depending on the particular reaction product that is desired to be formed. For example, in some embodiments, the order of the sequential reactions of the phosphonic acid-terminated primary alkyl amine and the sulfonic acid-terminated primary alkyl amine may be reversed. In other embodiments, the reaction of one or both of the phosphonic acid-terminated primary alkyl amine and the sulfonic acid-terminated alkyl amine may be omitted. In other embodiments, each of the sequential reaction operations may be performed, and in some embodiments, the sequential reaction operations may be performed in the order stated above in forming the final reaction product. Again, the various intermediate reaction products may be reacted with the subsequent amine-containing compounds without being isolated from the reaction mixture from which they were formed, or they may be isolated and/or purified in alternative embodiments.

In the above embodiments, reaction products may be prepared from an acrylamide polymer and one or more amine-containing compounds by a transamidation reaction. The acrylamide polymer may comprise those described above. In alternative embodiments, reaction products having related compositions to those described above may be prepared by a different synthetic methodology. Specifically, in some alternative embodiments, compositionally related reaction products may be prepared by an amidation reaction of the carboxylic acid groups in a partially hydrolyzed polyacrylamide or a copolymer thereof, or from polyacrylic acid itself. In some embodiments, acyl transfer agents (also commonly referred to in the art as peptide coupling agents even when not being used in forming a peptide bond) may be used to form an amide bond between the amine-containing compounds and the carboxylic acids, as illustrated in Scheme 2 below. It is again to be recognized that the random reaction pattern illustrated in Scheme 2 has been presented for purposes of exemplifying the embodiments described herein and should not be considered limiting. Moreover, when using a partially hydrolyzed polyacrylamide as the starting material, both amide groups and residual carboxylic acid groups may be present in the reaction product. In the interest of clarity, only residual carboxylic acids and amide groups formed therefrom have been depicted in the reaction product of Scheme 2.

Scheme 2 x = integer ranging from 1 to 28
Ay = any one or more of the following:
$A_1$ = $CH_3$
$A_2$ = $PO_3H_2$
$A_3$ = $SO_3H$
$A_4$ = iminodicarboxylic acid Illustrative acyl transfer agents that may be used in forming amide bonds from carboxylic acids include carbodiimide transfer agents, triazolol transfer agents and pentafluorophenyl ester transfer agents. Illustrative examples of such acyl transfer agents include, for example, dicyclohexylcarbodiimide (DCC), diisopropylcarbodiimide (DIC), 1-hydroxybenzotriazole (HOBT) and 1-ethyl-3-(3-dimethylaminopropyl)carbodiimide (EDC). Other examples of acyl transfer agents that may be used in forming the reaction products described herein will be familiar to one having ordinary skill in the art. In addition, it is to be recognized that the carboxylic acids may also be reacted in other ways to form the reaction products described herein, such as via an acid chloride intermediate, for example.

In still other alternative embodiments, the reaction products described herein may be formed by functionalizing the amide group of acrylamide or methacrylamide with any of the amine-containing compounds described herein and then copolymerizing the mixture of functionalized acrylamide monomers with unfunctionalized acrylamide, acrylic acid or any derivative thereof, or other various comonomers. Amidation and copolymerization of acrylic acid or methacrylic acid monomers can also be performed in a like manner to form compositionally related reaction products.

The reaction medium for performing the transamidation reactions described above may include water, a brine, a water-miscible organic solvent, or various mixtures thereof. In some embodiments, a surfactant may be included in the reaction medium to promote solubility of the reaction components, particularly hydrophobic amine-containing compounds. Suitable surfactants for use in forming the reaction products may include, for example, cationic, anionic, nonionic, or zwitterionic surfactants. Particularly desirable surfactants for use with the amine-containing compounds described herein may include anionic surfactants such as, for example, alkyl ether sulfates, alkyl phosphonates, and quaternary ammonium halide surfactants.

In various embodiments, the reaction products described herein may be used in treating a subterranean formation, particularly to at least partially suppress the passage of an aqueous fluid in the subterranean formation to a greater extent than is passage of an oleaginous fluid. In various embodiments, the reaction product may be present in a treatment fluid while being introduced to a subterranean formation.

In some embodiments, methods for treating a subterranean formation may comprise: providing a treatment fluid comprising a carrier fluid and a relative permeability modifier comprising a reaction product of 1) an acrylamide polymer, any copolymer thereof, any derivative thereof, any salt thereof, or any combination thereof, and 2) a plurality of amine-containing compounds or any salt thereof, each amine-containing compound containing a primary amine, a secondary amine, or any combination thereof, and the amine-containing compounds being randomly reacted with at least a portion of the amide groups of the acrylamide polymer; and introducing the treatment fluid into a subterranean formation.

In some embodiments, the amine-containing compounds may comprise one or more of a primary alkyl or aryl amine having about 2 to about 30 carbon atoms, a phosphonic acid-terminated primary alkyl amine, a sulfonic acid-terminated primary alkyl amine, an iminodicarboxylic acid-terminated primary alkyl amine, or any salt thereof. In more specific embodiments, the acrylamide polymer may be reacted with the primary alkyl or aryl amine having about 2 to about 30 carbon atoms and with at least one other amine-containing compound. In other various embodiments, the acrylamide polymer may be reacted with the iminodicarboxylic acid and with at least one other amine-containing compound. In some or other embodiments, the acrylamide polymer may be reacted with at least two of the amine-containing compounds. In some or other embodiments, the acrylamide polymer may be reacted with at least some of each of the amine-containing compounds.

In some embodiments, the subterranean formation being treated with the reaction products described herein may comprise a carbonate formation. Carbonate formations may predominantly comprise various carbonate minerals such as, for example, calcite (calcium carbonate) or dolomite (calcium magnesium carbonate). In some embodiments, a carbonate formation may comprise a chalk formation or a limestone formation. As discussed above, use of the reaction products described herein as a relative permeability modifier in a carbonate formation may be particularly advantageous.

Although use of the reaction products described herein as a relative permeability modifier in carbonate formations is believed to be particularly advantageous, it is also believed that their use in other types of subterranean formations may be advantageous as well. For example, in some or other embodiments, the subterranean formation being treated with the reaction products described herein may comprise a siliceous formation, which may comprise varying predominant amounts of silicate and/or aluminosilicate minerals such as, for example, silica, quartz, sandstone, clays, feldspars, and the like. In some embodiments, the siliceous formation being treated may comprise a sandstone formation. In some embodiments, the siliceous formation may be substantially free of carbonate minerals. In other embodiments, at least some carbonate minerals may also be present in a subterranean formation that otherwise predominantly comprises a siliceous mineral. For example, a siliceous formation, such as a sandstone formation, may comprise varying amounts of carbonate minerals, which may cement the siliceous minerals to one another. Use of the reaction products described herein for treating a siliceous formation also containing carbonate minerals may be particularly advantageous. In this regard, the reaction products described herein may be used in combination with those commonly used in treating siliceous formations, such as the hydrophobically modified hydrophilic polymers and hydrophilically modified hydrophilic polymers described in commonly owned U.S. Pat. No. 6,476,169.

In more specific embodiments, the methods described herein may comprise: providing a treatment fluid comprising a carrier fluid and a relative permeability modifier comprising a reaction product of 1) an acrylamide polymer, any copolymer thereof, any derivative thereof, any salt thereof, or any combination thereof, and 2) a plurality of amine-containing compounds or any salt thereof, the amine-containing compounds being randomly reacted with at least a portion of the amide groups of the acrylamide polymer and the amine-containing compounds comprising one or more of the following compounds or any salt thereof: a primary alkyl or aryl amine having about 2 to about 30 carbon atoms, a phosphonic acid-terminated primary alkyl amine, a sulfonic acid-terminated primary alkyl amine, and an iminodicarboxylic acid-terminated primary alkyl amine; introducing the treatment fluid into a carbonate formation; and at least partially suppressing passage of an aqueous fluid in the carbonate formation with the relative permeability modifier, the passage of the aqueous fluid being suppressed to a greater extent than is passage of an oleaginous fluid.

In some embodiments, the treatment fluids described herein may be operable to reduce the water permeability of a subterranean formation by at least about 80%. The reduction in water permeability may be at least about 85% in some embodiments, or at least about 90% in some embodiments, or at least about 95% in some embodiments, or at least about 98% in some embodiments, or at least about 99% in some embodiments. Measurement of the water permeability reduction may be determined by measuring the permeability reduction of a core sample obtained from the subterranean formation. Illustrative techniques for determining the water permeability reduction of a subterranean core sample may include those described in U.S. Pat. No. 6,476,169 and the examples herein, wherein the permeability reduction is measured relative to an untreated core sample.

In various embodiments, the treatment fluids described herein may comprise between about 0.1% to about 25% of the reaction product by weight. In more specific embodiments, the treatment fluids may comprise between about 0.5% to about 10% of the reaction product by weight, or between about 1% to about 7% of the reaction product by weight.

As discussed above, the reaction products described herein may be used to at least partially suppress the passage of an aqueous fluid, such as formation water, in a subterranean formation, while suppressing passage of an oleaginous fluid, such as oil, to a significantly lesser degree. In some embodiments, at least partially suppressing the passage of an aqueous fluid may result in decreased production of the aqueous fluid from the subterranean formation. For example, by treating the formation matrix in a subterranean formation or fractures therein, passage of formation water through the formation matrix/fractures may be suppressed, while the passage of a hydrocarbon resource through the formation matrix/fractures is suppressed to a lesser degree, thereby resulting in increased production of the hydrocarbon resource.

In other illustrative embodiments, the reaction products described herein may result in diversion of a subsequently introduced treatment fluid to a subterranean formation. For example, an aqueous treatment fluid introduced to a subterranean formation following the reaction product may be diverted to less permeable subterranean intervals than would otherwise occur, as the initially more permeable zones will become less permeable after interaction with the reaction product. In still other embodiments, a treatment fluid containing the reaction products described herein may be self-diverting.

In still other embodiments, the compositions described herein may be coated onto particulates, such as proppant particulates or bridging particulates, which may then be introduced into a subterranean formation. For example, in some embodiments, the compositions may be coated onto carbonate particulates, such as calcium carbonate particulates. In this regard, the coated particulates may serve as bridging particulates in the near wellbore region without substantially decreasing the permeability of an oleaginous fluid therein. The technique for coating the particulates is not believed to be particularly limited.

In other various embodiments, systems configured for delivering the relative permeability modifiers described herein to a downhole location are described. In various embodiments, the systems can comprise a pump fluidly coupled to a tubular, the tubular containing a relative permeability modifier comprising a reaction product of 1) an acrylamide polymer, any copolymer thereof, any derivative thereof, any salt thereof, or any combination thereof, and 2) a plurality of amine-containing compounds or any salt thereof, the amine-containing compounds being randomly reacted with at least a portion of the amide groups of the acrylamide polymer, and the amine-containing compounds comprising one or more of the following compounds or any salt thereof: a primary alkyl or aryl amine having about 2 to about 30 carbon atoms, a phosphonic acid-terminated primary alkyl amine, a sulfonic acid-terminated primary alkyl amine, and an iminodicarboxylic acid-terminated primary alkyl amine.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a relative permeability modifier of the present disclosure to a subterranean formation at or above a fracture gradient of the subterranean formation, but it may also be used in cases where fracturing is not desired. The relative permeability modifiers described herein may be introduced with a high pressure pump, or they may be introduced following a treatment fluid that was introduced with a high pressure pump. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the relative permeability modifier to the high pressure pump. In such embodiments, the low pressure pump may "step up" the pressure of a carrier fluid containing the relative permeability modifier before it reaches the high pressure pump.

Alternately, the low pressure pump may be used to directly introduce the relative permeability modifier to the subterranean formation.

In some embodiments, the systems described herein can further comprise a mixing tank that is upstream of the pump and in which the relative permeability modifier is formulated with a carrier fluid. In some embodiments, the reaction product may also be formed in the mixing tank. In various embodiments, the pump (e.g., a low pressure pump, a high pressure pump, or a combination thereof) may convey the relative permeability modifier from the mixing tank or other source of the relative permeability modifier to the tubular. In other embodiments, however, the relative permeability modifier can be formulated offsite and transported to a worksite, in which case the relative permeability modifier may be introduced to the tubular via the pump directly from its shipping container (e.g., a truck, a railcar, a barge, or the like) or from a transport pipeline. In either case, the relative permeability modifier may be drawn into the pump, elevated to an appropriate pressure, and then introduced into the tubular for delivery downhole.

Figure 1:
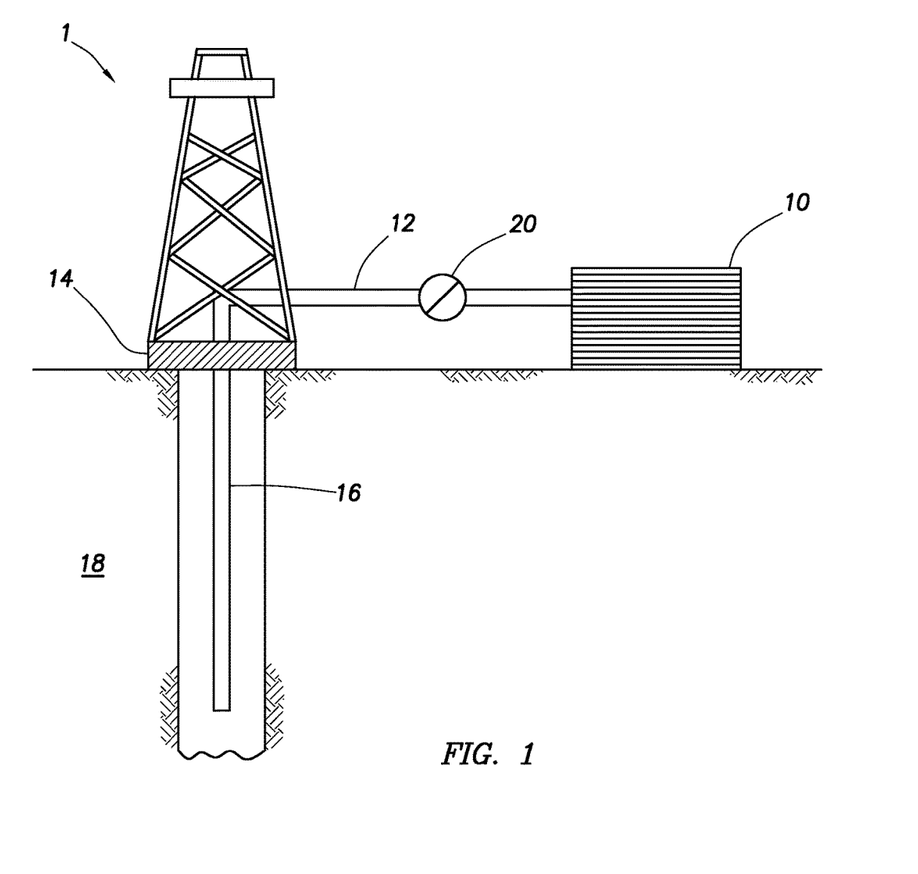
FIG. 1 shows an illustrative schematic of a system that can deliver treatment fluids of the present disclosure to a downhole location, according to one or more embodiments.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a composition of the present disclosure may be formulated. The composition may be conveyed via line 12 to wellhead 14, where the composition enters tubular 16, tubular 16 extending from wellhead 14 into subterranean formation 18. Tubular 16 may include orifices that allow the composition to enter into the subterranean formation. Upon being ejected from tubular 16, the composition may subsequently penetrate into subterranean formation 18. Pump 20 may be configured to raise the pressure of the composition to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 1, the composition may, in some embodiments, flow back to wellhead 14 and exit subterranean formation 18. In some embodiments, the composition that has flowed back to wellhead 14 may subsequently be recovered and recirculated to subterranean formation 18. In other embodiments, the composition may flow back to wellhead 14 in a produced hydrocarbon fluid from the subterranean formation.

It is also to be recognized that the disclosed compositions may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. Methods for treating a subterranean formation with a relative permeability modifier. The methods comprise: providing a treatment fluid comprising a carrier fluid and a relative permeability modifier comprising a reaction product of 1) an acrylamide polymer, any copolymer thereof, any derivative thereof, any salt thereof, or any combination thereof, and 2) a plurality of amine-containing compounds or any salt thereof, each amine-containing compound containing a primary amine, a secondary amine, or any combination thereof, and the amine-containing compounds being randomly reacted with at least a portion of the amide groups of the acrylamide polymer; and introducing the treatment fluid into a subterranean formation.

B. Methods for treating a carbonate formation with a relative permeability modifier. The methods comprise: providing a treatment fluid comprising a carrier fluid and a relative permeability modifier comprising a reaction product of 1) an acrylamide polymer, any copolymer thereof, any derivative thereof, any salt thereof, or any combination thereof, and 2) a plurality of amine-containing compounds or any salt thereof, the amine-containing compounds being randomly reacted with at least a portion of the amide groups of the acrylamide polymer and the amine-containing compounds comprising one or more of the following compounds or any salt thereof: a primary alkyl or aryl amine having about 2 to about 30 carbon atoms, a phosphonic acid-terminated primary alkyl amine, a sulfonic acid-terminated primary alkyl amine, and an iminodicarboxylic acid-terminated primary alkyl amine; introducing the treatment fluid into a carbonate formation; and at least partially suppressing passage of an aqueous fluid in the carbonate formation with the relative permeability modifier, the passage of the aqueous fluid being suppressed to a greater extent than is passage of an oleaginous fluid.

C. Polymer compositions. The compositions comprise: a relative permeability modifier comprising a reaction product of 1) an acrylamide polymer, any copolymer thereof, any derivative thereof, any salt thereof, or any combination thereof, and 2) a plurality of amine-containing compounds or any salt thereof, the amine-containing compounds being randomly reacted with at least a portion of the amide groups of the acrylamide polymer, and the amine-containing compounds comprising one or more of the following compounds or any salt thereof: a primary alkyl or aryl amine having about 2 to about 30 carbon atoms, a phosphonic acid-terminated primary alkyl amine, a sulfonic acid-terminated primary alkyl amine, and an iminodicarboxylic acid-terminated primary alkyl amine.

D. Methods for making a relative permeability modifier composition. The methods comprise: reacting at least a portion of the amide groups in an acrylamide polymer, any copolymer thereof, any derivative thereof, any salt thereof, or any combination thereof with one or more amine-containing compounds comprising one or more of the following compounds or any salt thereof: a primary alkyl or aryl amine having about 2 to about 30 carbon atoms, a phosphonic acid-terminated primary alkyl amine, and a sulfonic acid-terminated primary alkyl amine, an intermediate reaction product being formed that has at least some residual amide groups present therein; and reacting at least a portion of the residual amide groups in the intermediate reaction product with an iminodicarboxylic acid-terminated primary alkyl amine or any salt thereof to form a randomly functionalized acrylamide polymer.

E. Systems for placing a relative permeability modifier in a subterranean formation. The systems comprise: a pump fluidly coupled to a tubular, the tubular containing a relative permeability modifier comprising: a reaction product of 1) an acrylamide polymer, any copolymer thereof, any derivative thereof, any salt thereof, or any combination thereof, and 2) a plurality of amine-containing compounds or any salt thereof, the amine-containing compounds being randomly reacted with at least a portion of the amide groups of the acrylamide polymer, and the amine-containing compounds comprising one or more of the following compounds or any salt thereof: a primary alkyl or aryl amine having about 2 to about 30 carbon atoms, a phosphonic acid-terminated primary alkyl amine, a sulfonic acid-terminated primary alkyl amine, and an iminodicarboxylic acid-terminated primary alkyl amine.

Each of embodiments A, B, C, D and E may have one or more of the following additional elements in any combination:

Element 1: wherein the method further comprises at least partially suppressing passage of an aqueous fluid in the subterranean formation with the relative permeability modifier, the passage of the aqueous fluid being suppressed to a greater extent than is passage of an oleaginous fluid.

Element 2: wherein the subterranean formation comprises a carbonate formation.

Element 3: wherein the amine-containing compounds comprise one or more of a primary alkyl or aryl amine having about 2 to about 30 carbon atoms, a phosphonic acid-terminated primary alkyl amine, a sulfonic acid-terminated primary alkyl amine, an iminodicarboxylic acid-terminated primary alkyl amine, or any salt thereof.

Element 4: wherein the acrylamide polymer is reacted with the primary alkyl or aryl amine having about 2 to about 30 carbon atoms and at least one other amine-containing compound.

Element 5: wherein the acrylamide polymer is reacted with at least two of the amine-containing compounds.

Element 6: wherein the acrylamide polymer is reacted with at least some of each of the amine-containing compounds.

Element 7: wherein the acrylamide polymer comprises polyacrylamide, a copolymer of acrylamide and t-butyl acrylate, a partially hydrolyzed variant thereof, a hydrophobically modified variant thereof, any derivative thereof, any salt thereof, or any combination thereof.

Element 8: wherein the composition further comprises a carrier fluid in which the relative permeability modifier is disposed.

Element 9: wherein the acrylamide polymer is reacted with a mixture comprising the primary alkyl or aryl amine having about 2 to about 30 carbon atoms, the phosphonic acid-terminated primary alkyl amine, and the sulfonic acid-terminated primary alkyl amine, or any salt thereof to form an intermediate reaction product, and the intermediate reaction product is thereafter reacted with the iminodicarboxylic acid-terminated primary alkyl amine or any salt thereof to form the reaction product.

Element 10: wherein reacting at least a portion of the residual amide groups in the intermediate reaction product takes place after reacting the acrylamide polymer with the other amine-containing compounds.

Element 11: wherein the primary alkyl or aryl amine having about 2 to about 30 carbon atoms, the phosphonic acid-terminated primary alkyl amine, the sulfonic acid-terminated primary alkyl amine, or any salt thereof are present together in a mixture while being reacted with the acrylamide polymer.

Element 11: wherein the intermediate reaction product is reacted with the iminodicarboxylic acid-terminated primary alkyl amine or any salt thereof without isolating the intermediate reaction product.

By way of non-limiting example, exemplary combinations applicable to A, B, C, D and E include:

The method of A in combination with elements 3 and 7.
The method of A in combination with elements 2, 3 and 6.
The method of A in combination with elements 2, 3 and 7.
The method of B in combination with elements 4 and 7.
The method of B in combination with elements 5 and 7.
The method of B in combination with elements 6 and 7.
The composition of C in combination with elements 7 and 8.
The composition of C in combination with elements 5, 7 and 8.
The composition of C in combination with elements 6, 7 and 8.
The method of D in combination with elements 4 and 7.
The method of D in combination with elements 5 and 7.
The method of D in combination with elements 6 and 7.
The method of D in combination with elements 7 and 9.
The method of D in combination with elements 7, 10 and 12.
The system of E in combination with elements 5 and 7.
The system of E in combination with elements 6 and 7.

To facilitate a better understanding of the embodiments of the present disclosure, the following examples of preferred or representative embodiments are given. In no way should the following examples be read to limit, or to define, the scope of the disclosure.

EXAMPLES

Example 1: Syntheses

Syntheses of the reaction products used in the ensuing examples were carried out by a partial stepwise reaction as illustrated in Scheme 3 below. Equal quantities of taurine (aminoethylsulfonic acid), aminoethylphosphonic acid and hexadecylamine were combined in a pH 8.5 aqueous slurry also containing 0.05% to 20% HZ-10 by weight and 0.05% to 3 wt. % MARCOR 716 cationic surfactant (trimethylbenzylammonium chloride, WSP Chemicals). Based on the loading of the HZ-10 active polymer in one instance, the loading of hexadecylamine was 0.5 wt. %, the loading of taurine was 0.5 wt. %, and the loading of aminoethylphosphonic acid was 1.0 wt. %. The resultant mixture was then heated to 200° F. from 4 to 72 hours to form an intermediate reaction product.

Meanwhile, in a separate reaction mixture, iminodiacetic acid or iminodisuccinic acid was placed in water, and the pH was adjusted to 7.5. Bromopropylamine hydrobromide or chloropropylamine hydrochloride was then added to the reaction mixture, and the homogenous solution was heated to 170° F. for 2 to 4 hours to form an iminodicarboxylic acid-terminated primary alkyl amine.

Subsequently, the intermediate reaction product and the iminodicarboxylic acid-terminated primary alkyl amine were combined without further isolation or purification being carried out, and the combined reaction mixture was then heated at 200° F. for 4 to 72 hours to form the reaction product. The loading of the iminodicarboxylic acid-terminated primary alkyl amine was 3.0 wt. % relative to the active polymer in the HZ-10.

Figure 2:
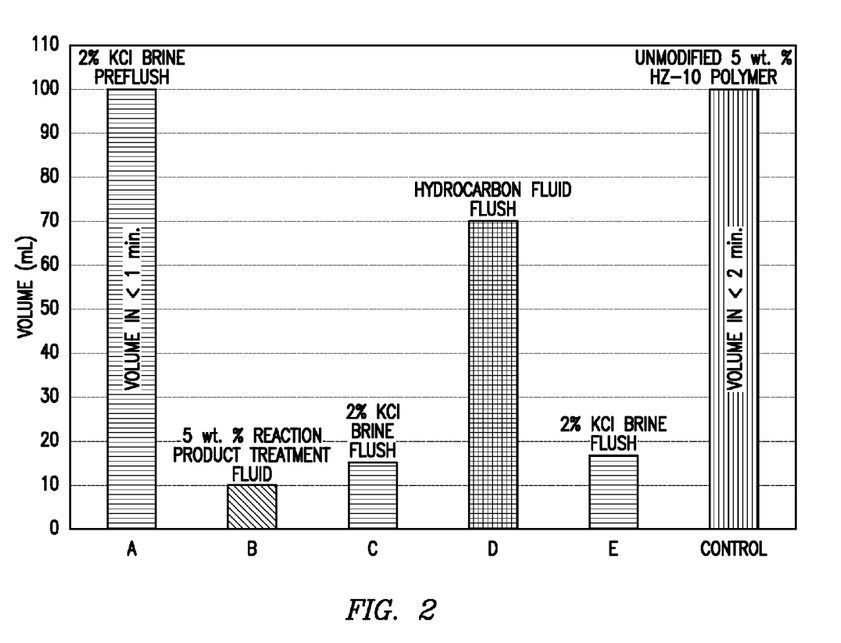
FIG. 2 shows an illustrative plot of fluid loss performance for the various treatment stages conducted in Example 2 using a treatment fluid containing 5% by weight of a reaction product of Example 1.

Example 2: Testing of the Water Permeability Reduction on a Calcium Carbonate Filter Cake and Core Flow Testing on a Carbonate Core Fluid loss testing was conducted in a Fann High Pressure High Temperature fluid loss cell. To the fluid loss cell was added 20 grams of BARACARB 50 (calcium carbonate, available from Halliburton Energy Services) slurried in 60 mL of water. The water was then removed under pressure to form a filter cake in the fluid loss cell. The filter cake was then treated with 2% aqueous KCl solution, and the rate at which the 2% aqueous KCl solution passed through the filter cake was measured (FIG. 2, Operation A). The same filter cake was then treated with various treatment fluids containing the reaction products produced in accordance with Example 1 at a temperature of 170° F. (FIG. 2, Operation B). The rate at which the treatment fluid passed through the filter cake was measured, as was the volume of the recovered treatment fluid. Thereafter, the residual treatment fluid was removed from the fluid loss cell. A second 2% aqueous KCl brine flush was then performed at the same temperature (FIG. 2, Operation C). The permeability reduction of hydrocarbons through the filter cake was then tested by applying LCA-1 (a liquid hydrocarbon formulation available from Halliburton Energy Services) to the filter cake (FIG. 2, Operation D). Finally, after passing the hydrocarbons through the filter cake, 2% aqueous KCl brine was flowed through the filter cake a third time at the same test temperature and the volume of collected fluid was measured over time (FIG. 2, Operation E). A pressure of 30 psi was applied to the fluid loss cell in all instances.

Testing results are summarized in FIG. 2, which shows an illustrative plot of fluid loss performance for the various treatment stages conducted in Example 2 using a treatment fluid containing 5% by weight of a reaction product of Example 1. The measured fluid loss volumes depicted in FIG. 2 represent the fluid volumes collected over 10 minutes at 170° F. unless otherwise indicated. As shown in FIG. 2, after application of the treatment fluid in Operation B, only low aqueous fluid volumes (brine) passed through the filter cake thereafter (Operations C and E). In contrast, a much higher volume (75 mL, total amount added to the cell) of the liquid hydrocarbon formulation passed through the filter cake in a shorter amount of time in Operation D. For comparison, in less than 1 minute, 100 mL of the liquid hydrocarbon formulation passed through an untreated filter cake prepared and tested under comparable conditions, but without applying the treatment fluid in Operation B (data not shown). By comparing the collected fluid volumes in Operations C and E in FIG. 2, it can be seen that applying the liquid hydrocarbon formulation essentially did not alter the water permeability of the filter cake. Hence, the filter cake remained disproportionately permeable to aqueous and oleaginous fluids.

For control purposes, an unmodified 5 wt. % HZ-10 sample was applied to an untreated BARACARB filter cake under comparable testing conditions. As shown in FIG. 2, the fluid leak off was much higher in this case, indicating that the unmodified polymer displays a much smaller degree of permeability reduction toward aqueous fluids.

Figure 3:
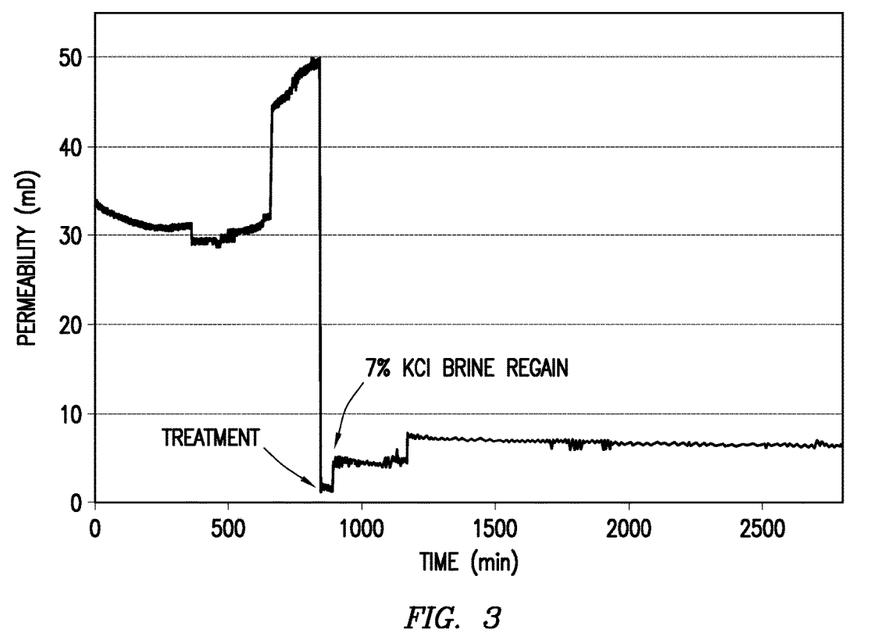
FIG. 3 shows an illustrative core flow plot of a carbonate core treated with a reaction product of Example 1.

FIG. 3 shows an illustrative core flow plot of a carbonate core treated with a reaction product of Example 1. As can be seen in FIG. 3, applying the reaction product to the core drastically lowered the core's permeability with respect to a subsequently introduced aqueous 7% KCl brine fluid.

Example 3: Comparative Permeability Testing

The reaction product of Example 1 was formulated into a treatment fluid having a reaction product concentration of 1 wt. %. A WATERWEB (Halliburton Energy Services) treatment fluid having a hydrophobically modified hydrophilic polymer concentration of 1 wt. % was also formulated. The treatment fluids were then applied to separate BARACARB filter cakes. Before application of the treatment fluids to each filter cake, 100 mL of 2% aqueous KCl brine was applied to the filter cakes, and essentially all 100 mL of the 2% aqueous KCl brine flush eluted through the filter cakes in less than 1 minute. Thereafter, the treatment fluids were applied to the filter cakes in accordance with Example 2 at 170° F. and the eluted treatment fluid was collected. 100 mL of eluted WATERWEB treatment fluid was collected, whereas only 55 mL of the treatment fluid containing the reaction product of Example 1 eluted through the filter cake. Following elution of the treatment fluids, each filter cake was then eluted with 100 mL of 2% aqueous KCl brine at 170° F. For the filter cake treated with the reaction product of Example 1, 95 mL of the 2% aqueous KCl solution was collected over 10 2% aqueous KCl brine was determined thereafter at the same temperature. As shown in Table 1, various acrylamide polymers and hydrolyzed variants thereof produced reaction products that gave good fluid loss performance over a range of reaction product concentrations. Moreover, the fluid loss performance was tunable depending upon which amine-containing compounds were present.

TABLE 1

| Sample | Acrylamide Polymer | Amine-Containing Compounds Reacted with Acrylamide Polymer | % of Polymer Functionalized | Reaction Product Concentration in Treatment Fluid (wt. %) | Treatment Fluid Volume (mL) | Fluid Loss of 2% KCl Brine Over 10 Min. (mL) |
|---|---|---|---|---|---|---|
| A | ALCOMER 90L[1] | HDA, AESA | 1 | 0.5 | 23 | 70 |
| B | VA6162-2[2] | None | 0 | 0.5 | 16 | 2 |
| C | HZ-10[3] | HDA, AESA | 2 | 5 | 27 | 53 |
| D | HZ-10 | HDA, AESA | 2 | 2.5 | 35 | 43 |
| E | HZ-10 | HDA, APIDAA | 4 | 5 | 43 | 95 |
| F | HZ-10 | HDA, AESA, AEPA | 3 | 10 | 25 | 50 |
| G | HZ-10 | HDA, AESA, AEPA, APIDAA | 6 | 10 | 6 | 5 |
| H | HZ-10 | HDA, AESA, AEPA, APIDAA | 6 | 10 | 9 | 2 |
| I | HZ-10 | HDA, AESA, AEPA, APIDAA | 6 | 5 | 10 | 15 |
| J | HZ-10 | HDA, ACA | 1 | 10 | 40 | >100 |
| K | HZ-10 | HDA, ACA | 1 | 5 | 75 | >100 |
| L | HZ-10 | HDA, APIDAA | 4 | 10 | 10 | >100 |
| M | HZ-10 | HDA, APIDAA | 4 | 5 | 65 | >100 |

[1]partially hydrolyzed polyacrylamide (BASF)
[2]hydrophobically modified acrylic acid/acrylamide copolymer (BASF)
[3]copolymer of acrylamide and t-butyl acrylate (Halliburton Energy Services)
HDA = hexadecylamine
AESA = aminoethylsulfonic acid
AEPA = aminoethylphosphonic acid
APIDAA = aminopropyliminodiacetic acid
ACA = aminocaproic acid minutes. In contrast, for the filter cake treated with the WATERWEB treatment fluid, essentially all of the applied 2% aqueous KCl solution was collected in approximately 1 minute. Therefore, even though a smaller quantity of the reaction product of Example 1 was passed through the filter cake, the reaction product produced a greater water permeability reduction than did the hydrophobically modified hydrophilic polymer of the WATERWEB treatment fluid.

Example 4: Comparative Fluid Loss Performance of Various Reaction Products

Various reaction products were formed using the procedure of Example 1 or a modified variant thereof, omitting amine-containing compounds as needed to form a reaction product of a desired composition. The reaction product was then formulated into a treatment fluid having a defined weight percentage of the reaction product, as identified in Table 1. The percentage of the polymer functionalized was based on the presumption of complete reaction of the amine-containing compounds with the amide compounds of the polymer. The treatment fluids were then applied to a BARACARB filter cake at either room temperature (samples A-G and J-M) or 170° F. (samples H and I), and the amount of the treatment fluid eluting through the filter cake over 10 minutes was determined. The regain permeability of Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
providing a treatment fluid comprising a carrier fluid and a relative permeability modifier comprising a reaction product of 1) an acrylamide polymer, any copolymer thereof, any derivative thereof, any salt thereof, or any combination thereof, and 2) a plurality of amine-containing compounds or any salt thereof, each amine-containing compound containing a primary amine, a secondary amine, or any combination thereof, and the amine-containing compounds being randomly reacted through transamidation with at least a portion of the amide groups of the acrylamide polymer; and
introducing the treatment fluid into a subterranean formation.

2. The method of claim 1, further comprising:
at least partially suppressing passage of an aqueous fluid in the subterranean formation with the relative permeability modifier, the passage of the aqueous fluid being suppressed to a greater extent than is passage of an oleaginous fluid.

3. The method of claim 1, wherein the subterranean formation comprises a carbonate formation.

4. The method of claim 1, wherein the amine-containing compounds comprise one or more of a primary alkyl or aryl amine having about 2 to about 30 carbon atoms, a phosphonic acid-terminated primary alkyl amine, a sulfonic acid-terminated primary alkyl amine, an iminodicarboxylic acid-terminated primary alkyl amine, or any salt thereof.

5. The method of claim 4, wherein the acrylamide polymer is reacted with the primary alkyl or aryl amine having about 2 to about 30 carbon atoms and at least one other amine-containing compound.

6. The method of claim 4, wherein the acrylamide polymer is reacted with at least two of the amine-containing compounds.

7. The method of claim 4, wherein the acrylamide polymer is reacted with at least some of each of the amine-containing compounds.

8. The method of claim 4, wherein the acrylamide polymer comprises polyacrylamide, a copolymer of acrylamide and t-butyl acrylate, a partially hydrolyzed variant thereof, a hydrophobically modified variant thereof, any derivative thereof, any salt thereof, or any combination thereof.

9. A method comprising:
providing a treatment fluid comprising a carrier fluid and a relative permeability modifier comprising a reaction product of 1) an acrylamide polymer, any copolymer thereof, any derivative thereof, any salt thereof, or any combination thereof, and 2) a plurality of amine-containing compounds or any salt thereof, the amine-containing compounds being randomly reacted through transamidation with at least a portion of the amide groups of the acrylamide polymer and the amine-containing compounds comprising one or more of the following compounds or any salt thereof:
a primary alkyl or aryl amine having about 2 to about 30 carbon atoms,
a phosphonic acid-terminated primary alkyl amine,
a sulfonic acid-terminated primary alkyl amine, and
an iminodicarboxylic acid-terminated primary alkyl amine;
introducing the treatment fluid into a carbonate formation; and
at least partially suppressing passage of an aqueous fluid in the carbonate formation with the relative permeability modifier, the passage of the aqueous fluid being suppressed to a greater extent than is passage of an oleaginous fluid.

10. The method of claim 9, wherein the acrylamide polymer comprises polyacrylamide, a copolymer of acrylamide and t-butyl acrylate, a partially hydrolyzed variant thereof, a hydrophobically modified variant thereof, any derivative thereof, any salt thereof, or any combination thereof.

11. The method of claim 9, wherein the acrylamide polymer is reacted with the primary alkyl or aryl amine having about 2 to about 30 carbon atoms and at least one other amine-containing compound.

12. The method of claim 9, wherein the acrylamide polymer is reacted with at least two of the amine-containing compounds.

13. The method of claim 9, wherein the acrylamide polymer is reacted with at least some of each of the amine-containing compounds.

* * * * *